United States Patent
Gao

(10) Patent No.: US 10,811,972 B2
(45) Date of Patent: Oct. 20, 2020

(54) BUCK-BOOST CONVERTER POWER SUPPLY WITH DRIVE CIRCUIT

(71) Applicant: INTERSIL AMERICAS LLC, Milpitas, CA (US)

(72) Inventor: Baocheng Gao, Shenzhen (CN)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 16/257,067

(22) Filed: Jan. 24, 2019

(65) Prior Publication Data

US 2019/0173383 A1 Jun. 6, 2019

Related U.S. Application Data

(63) Continuation of application No. PCT/CN2016/092759, filed on Aug. 1, 2016.

(51) Int. Cl.
*H02M 1/08* (2006.01)
*H02M 3/158* (2006.01)
(Continued)

(52) U.S. Cl.
CPC ........... *H02M 3/1582* (2013.01); *H02M 1/08* (2013.01); *H02M 3/156* (2013.01); *H02M 2001/0009* (2013.01)

(58) Field of Classification Search
CPC .... H02M 3/156; H02M 3/158; H02M 3/1588; H02M 3/155; H02M 3/1582;
(Continued)

(56) References Cited

U.S. PATENT DOCUMENTS 5,841,643 A * 11/1998 Schenkel .......... H02M 3/33507
363/21.13
6,198,260 B1 3/2001 Wittenbreder
(Continued)

FOREIGN PATENT DOCUMENTS

CN 101071982 A 11/2007
CN 101478237 A 7/2009
(Continued)

OTHER PUBLICATIONS

International Search Report and Written Opinion for PCT/CN2016/092759 dated May 2, 2017.

*Primary Examiner* — Bryan R Perez
(74) *Attorney, Agent, or Firm* — Foley & Lardner LLP

(57) ABSTRACT

In an embodiment, a power supply includes first and second supply input nodes, a supply output node, first and second switch circuits, a filter circuit, and a drive circuit. The first and second supply input nodes are respectively configured to receive first and second input voltages, and the supply output node is configured to provide an output voltage. The first switch circuit has a first conduction node coupled to the first supply input node, a second conduction node, and a control node configured to receive a first control signal, and the filter circuit has a first node coupled to the second conduction node and has a second node. The second switch circuit has a first conduction node coupled to the second node of the filter circuit, a second conduction node coupled to the second supply input node, and a control node. And the drive circuit has an input node coupled to one of the control node of the first switch circuit and the first node of the filter circuit, and has an output node coupled to the control node of the second switch circuit.

11 Claims, 7 Drawing Sheets

(51) Int. Cl.
*H02M 1/00* (2006.01)
*H02M 3/156* (2006.01)

(58) Field of Classification Search
CPC ............... H02M 3/157; H02M 3/1563; H02M 2003/1566; H02M 2003/1557; H02M 2001/0012; H02M 2001/0009; H02M 2001/385; H02M 1/12; H02M 1/42; H02M 1/4225; H02M 1/4233; H02M 1/4241; H02M 1/4258; H02M 1/425; H02M 1/4208
See application file for complete search history.

(56) References Cited

U.S. PATENT DOCUMENTS

| | | | |
|---|---|---|---|
| 6,232,752 B1 | 5/2001 | Bissell | |
| 2009/0058388 A1* | 3/2009 | Kanakubo | H02M 3/1582 323/288 |

FOREIGN PATENT DOCUMENTS

| | | |
|---|---|---|
| CN | 101640480 A | 2/2010 |
| CN | 101753023 A | 6/2010 |

* cited by examiner

BUCK-BOOST CONVERTER POWER SUPPLY WITH DRIVE CIRCUIT

CROSS-REFERENCE TO RELATED APPLICATIONS

The present application is a bypass continuation of PCT Application No. PCT/CN2016/092759, filed on Aug. 1, 2016, the contents of which are incorporated herein by reference in their entirety.

SUMMARY

In an embodiment, a power supply includes first and second supply input nodes, a supply output node, first and second switch circuits, a filter circuit, and a drive circuit. The first and second supply input nodes are respectively configured to receive first and second input voltages, and the supply output node is configured to provide an output voltage. The first switch circuit has a first conduction node coupled to the first supply input node, a second conduction node, and a control node configured to receive a first control signal, and the filter circuit has a first node coupled to the second conduction node and has a second node. The second switch circuit has a first conduction node coupled to the second node of the filter circuit, a second conduction node coupled to the second supply input node, and a control node. And the drive circuit has an input node coupled to one of the control node of the first switch circuit and the first node of the filter circuit, and has an output node coupled to the control node of the second switch circuit.

In an embodiment, such a power supply can operate in a buck-boost mode even with a power-supply controller having as few as two switch-circuit-control output nodes per power-supply phase. Therefore, such a power supply can include a less complex, and less expensive, power-supply controller than many prior buck-boost power supplies. Furthermore, such a power supply allows a power-supply designer a greater variety of power-supply controllers from which to choose, because there are more controllers having two switch-control output nodes per phase on the market than there are controllers having more than two (e.g., four) switch-circuit-control output nodes per phase.

DETAILED DESCRIPTION

Figure 1:
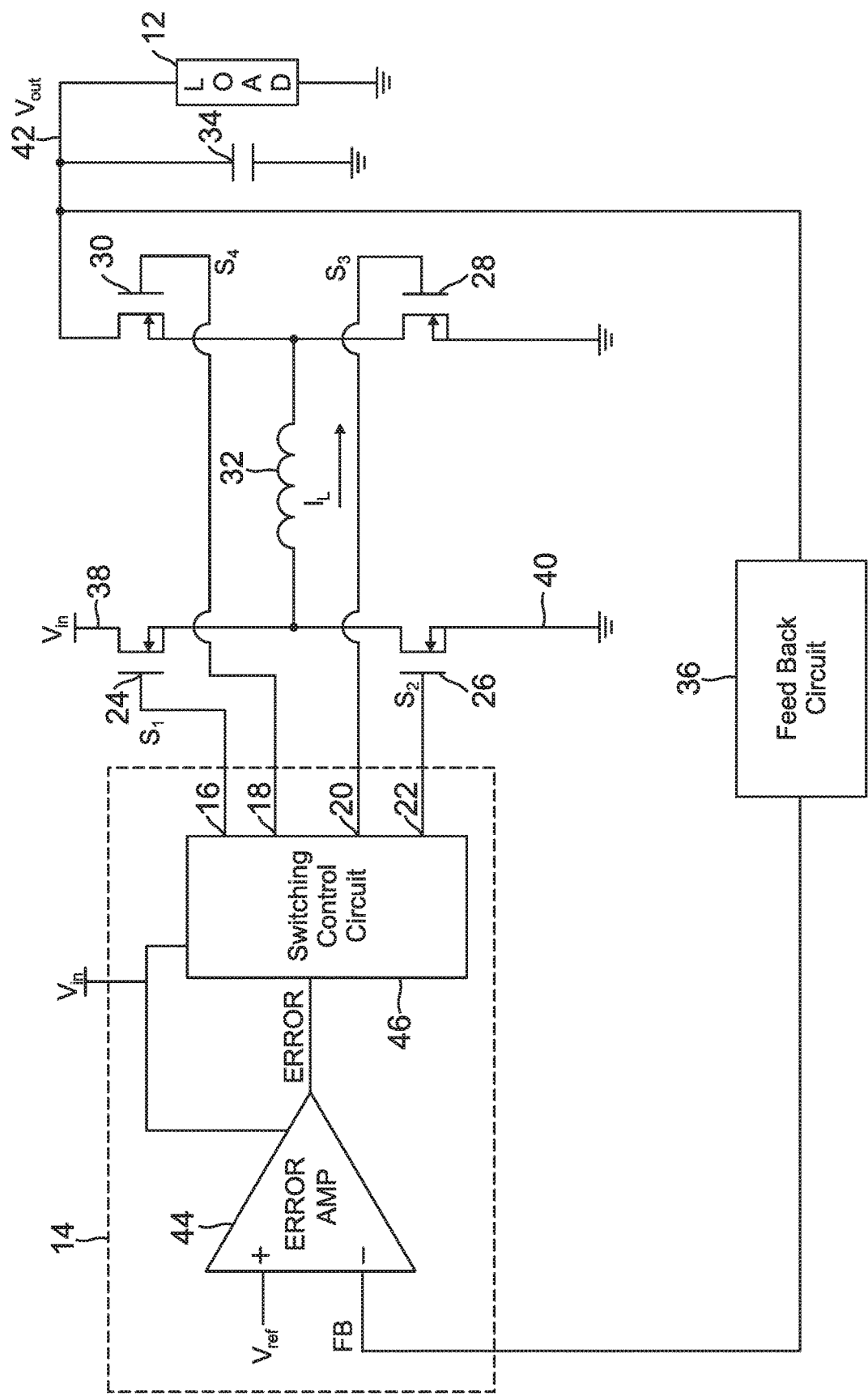
FIG. 1 is a diagram of a buck-boost converter power supply, and of a load powered by the power supply.

FIG. 1 is a diagram of a power supply, here a buck-boost converter power supply 10, and a load 12 powered by the power supply. As described below, a problem with the power supply 10 is that uses a power-supply controller integrated circuit (IC) 14 having four switch-circuit-control output nodes 16, 18, 20, and 22. Therefore, the controller IC 14 is typically more expensive, and in shorter supply, than controllers having fewer than four (e.g., two) switch-circuit-control output nodes.

In addition to the controller IC 14, the buck-boost converter power supply 10 includes switch circuits, here transistors, 24, 26, 28, and 30, a filter circuit, here a phase inductor, 32, an output filter capacitor 34, a feedback circuit 36, a first supply input node 38 configured to receive a first input supply voltage $V_{in}$ (e.g., from a battery or from another power supply), a second supply input node 40 configured to receive a second input supply voltage, here ground, and a supply output node 42 configured to provide a regulated output voltage $V_{out}$. The power supply 10 can include other components that are omitted from FIG. 1 for brevity.

The power-supply controller IC 14 includes an error amplifier 44 and a switching control circuit 46, and is configured to generate a reference signal, here a reference voltage, $V_{ref}$, with, for example, a conventional bandgap-voltage reference circuit (not shown in FIG. 1). The error amplifier 44 is configured to compare a feedback signal, here a feedback voltage, FB from the feedback circuit 36 to $V_{ref}$, and to generate an error signal, here an error voltage, ERROR in response to this comparison. The switching control circuit 46 is configured to generate switching signals S1-S4 in response to the signal ERROR, and these switching signals respectively control the conduction states conducting (e.g., "on") and non-conducting e.g., "off") of the transistors 24-30. For example, if FB is less than $V_{ref}$, then, in response to the resulting signal ERROR, the switching control circuit 46 is configured to generate the switching signals S1-S4 such that the average current $I_L$ through the inductor 32 increases, and, therefore, such that $V_{out}$ increases toward a regulated value (e.g., 1.1 Volt (V), 1.3V, 3.3V, 5V, and 12V) that the power supply 10 is configured to generate for $V_{out}$. In contrast, if FB is greater than $V_{ref}$, then, in response to the resulting signal ERROR, the switching control circuit 46 is configured to generate the switching signals S1-S4 such that the average current $I_L$ through the inductor 32 decreases, and, therefore, such that $V_{out}$ decreases toward its regulated value. The circuit topologies of the error amplifier 44 and the switching control circuit 46 can be conventional; therefore, for brevity, these topologies are omitted from FIG. 1 and are not described in detail. For example, the error amplifier 44 can include frequency compensation circuitry. And although not shown in FIG. 1, the controller IC 14 can include a comparator configured to compare $V_{in}$ to $V_{out}$ so that the controller IC can determine whether to operate the power supply 10 in buck mode (e.g., while $V_{in} > V_{out}$) or in boost mode (e.g., while $V_{in} < V_{out}$).

The transistors 24-30 are respective NMOS switching transistors, although one or more of these NMOS transistors (e.g., one or both of the transistors 24 and 30) can be replaced with respective PMOS transistors. The transistors 24 and 30 can be respectively referred to as first and second high-side transistors, respectively; likewise, the transistors 26 and 28 can be respectively referred to as first and second low-side transistors.

And the feedback circuit 36 converts $V_{out}$ into the feedback signal, here the feedback voltage, FB. For example, the feedback circuit 36 can include a conventional resistor voltage divider that generates FB=$k \cdot V_{out}$, where k<1 and is set by the values of the resistors that form the voltage divider.

During operation of the buck-boost converter power supply 10, the power-supply controller IC 14 first determines whether $V_{in} > V_{out}$.

If the controller IC 14 determines that $V_{in} > V_{out}$, then the controller IC causes the power supply 10 to operate in a buck mode.

While operating in a buck mode, the switching control circuit 46 generates the switching control signal S3 having a low level such that the transistor 28 is always off, and generates the switching control signal S4 having a high level such that the transistor 30 is always on.

And the switching control circuit 46 generates the signals S1 and S2 to switch the transistors 24 and 26 at a duty cycle that regulates $V_{out}$ to the value set by $V_{ref}$ and the feedback circuit 36.

If, however, the controller IC 14 determines that $V_{in} < V_{out}$, then the controller IC causes the power supply 10 to operate in a boost mode.

Figure 2:
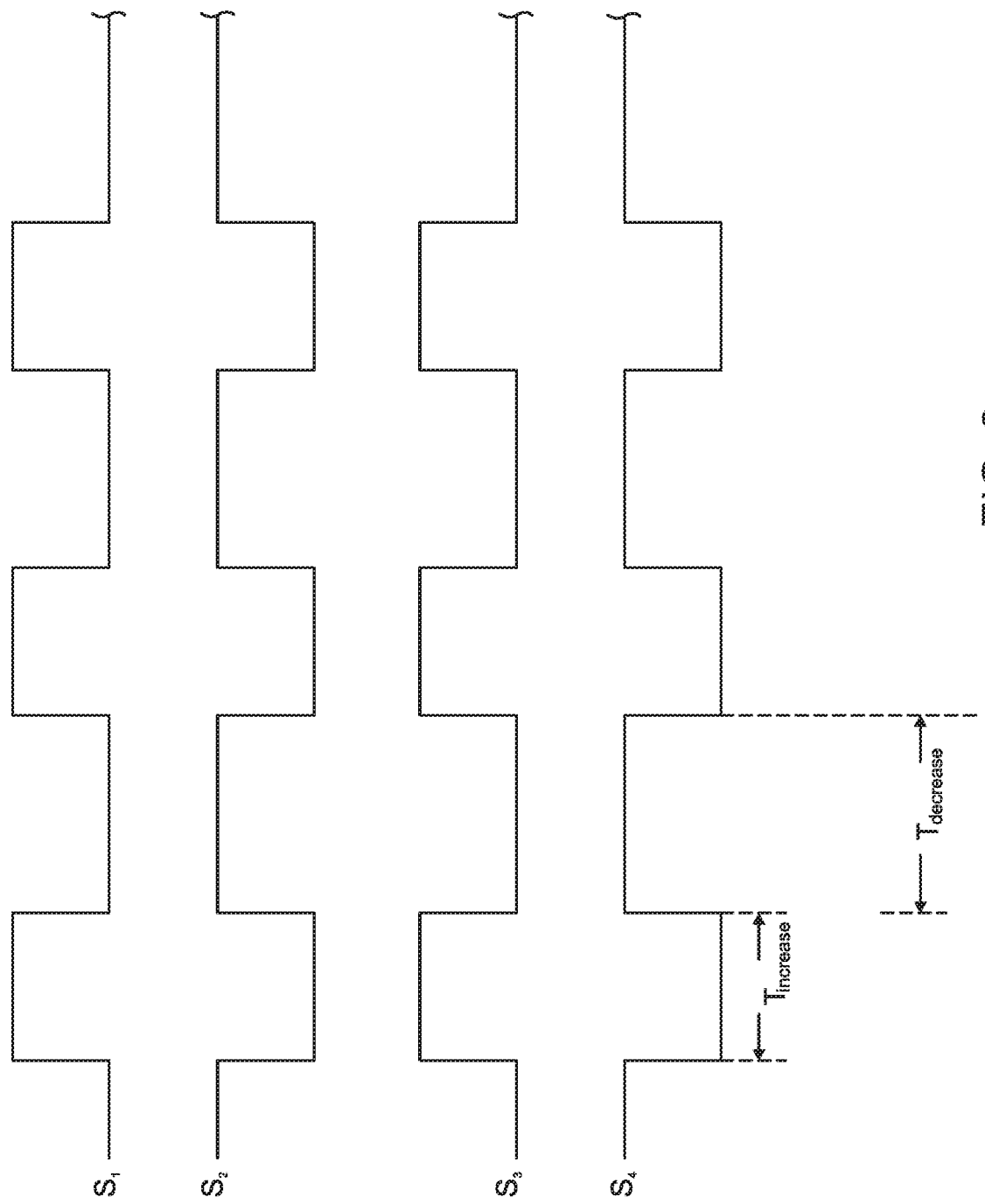
FIG. 2 is a timing diagram of the switch-circuit control signals of FIG. 1.

FIG. 2 is a diagram of the switch-control signals S1-S4 while the buck-boost converter power supply 10 of FIG. 1 is operating in a boost mode.

Referring to FIGS. 1-2, operation of the buck-boost converter power supply 10 in boost mode is described.

During a first portion, $T_{charge}$, of a boost-mode cycle, the switching control circuit 46 generates the signals S1 and S3 having a logic-high level such that the transistors 24 and 28 are on, and generates the signals S2 and S4 having a logic-low level such that the transistors 26 and 30 are off. Although FIG. 2 shows S1 and S3 as having the same logic-high level, the actual voltage levels of S1 and S3 may differ because the source of the transistor 24 is coupled to the phase node (the input node of the inductor 32), which is at a higher voltage (e.g., approximately $V_{in}$) than is the grounded source of the transistor 28. Similarly, although FIG. 2 shows S2 and S4 having the same logic-low level, the actual voltage levels of S2 and S4 may differ because the source of the transistor 30 is coupled to the output node of the inductor 32, which output node is at a higher voltage (e.g., approximately $V_{out}$) than is the grounded source of the transistor 26.

Therefore, during $T_{charge}$, a linearly increasing, i.e., inductor-charging, current $I_L$ flows from $V_{in}$, through the transistor 24, the inductor 32, and the transistor 28, to ground.

During a second portion $T_{discharge}$ of a boost-mode cycle, the switching control circuit 46 generates the signals S1 and S3 having a logic-low level such that the transistors 24 and 28 are off, and generates the signals S2 and S4 having a logic-high level such that the transistors 26 and 30 are on. Although FIG. 2 shows S1 and S3 having the same logic-low level, the actual voltage levels of S1 and S3 may differ because the source of the transistor 24 is coupled to the phase node, which is at a lower voltage (e.g., approximately one transistor rds drop below ground) than is the grounded source of the transistor 28. Similarly, although FIG. 2 shows S2 and S4 having the same logic-high level, the actual voltage levels of S2 and S4 may differ because the source of the transistor 30 is coupled to the output node of the inductor 32, which output node is at a higher voltage (e.g., approximately $V_{out}$) than is the grounded source of the transistor 26.

Therefore, during $T_{discharge}$, a linearly decreasing, i.e., inductor-discharging, current $I_L$ flows from ground, through the transistor 26, the inductor 32, and the transistor 30, to $V_{out}$.

Consequently, the controller 14 is configured to regulate $V_{out}$ during a boost mode by controlling the duty cycle $$\left(\text{i.e., } \frac{T_{charge}}{T_{charge} + T_{discharge}}\right)$$

of the transistors 24 and 28.

Referring again to FIG. 1, if $V_{in} \sim V_{out}$ but is within a threshold voltage of $V_{out}$, then the controller IC 14 can be configured to regulate $V_{out}$ by controlling the power supply 10 to alternate between buck mode and boost mode. The designer of the power supply 10 can select the threshold voltage based on criteria such as, but not limited to, the regulated value of $V_O$ and the anticipated steady-state current to the load 12.

Referring again to FIGS. 1 and 2, alternate embodiments of the buck-boost converter power supply 10 are contemplated. For example, although the rising edges of S1 and S3 and the falling edges of S2 and S4, and the falling edges of S1 and S3 and the rising edges of S2 and S4, are described as occurring simultaneously, the switching control logic 46 can be configured to offset two or more of these edges relative to each other, or relative to other ones of the edges. Such an offset can imbue to the power supply 10 operational features such as zero-voltage switching (ZVS), zero-current switching (ZCS), or prevention of crowbar currents respectively flowing through the transistors 24 and 26 and through the transistors 28 and 30.

Still referring to FIGS. 1 and 2, as mentioned above, a problem with the buck-boost converter power supply 10 is that the controller IC 14 includes four switch-circuit-control output nodes 16, 18, 20, and 22 on which the controller IC respectively generates the drive signals S1-S4. For example, because the controller IC 14 includes four switch-circuit-control output nodes per power-supply phase, the controller IC can include more circuitry, consume more power, and be more expensive than a power-supply controller IC having fewer than four switch-circuit-control output nodes per power-supply phase. Furthermore, controller ICs 14 having fewer than four (e.g., having two) switch-circuit-control output nodes per power-supply phase tend to be more commercially available, and, therefore, easier to obtain, than controller ICs having four or more switch-circuit-control output nodes per power-supply phase.

A solution to this problem is to replace each of the transistors 26 and 30 with a respective diode, and to replace the controller IC 14 with a controller IC having only two switch-circuit drive nodes per power-supply phase.

But this solution has problems. For example, replacing the transistors 26 and 30 with respective diodes can reduce the conversion efficiency of the power supply 10 because the voltage across a conducting diode typically is significantly higher than the voltage across a conducting/on switching transistor. Furthermore, if the replacement for the controller IC 14 is configured for operating a power supply only in a buck mode, then the controller IC will be unable to generate the signal S3, and, therefore, will be unable to properly drive the transistor 28.

Figure 3:
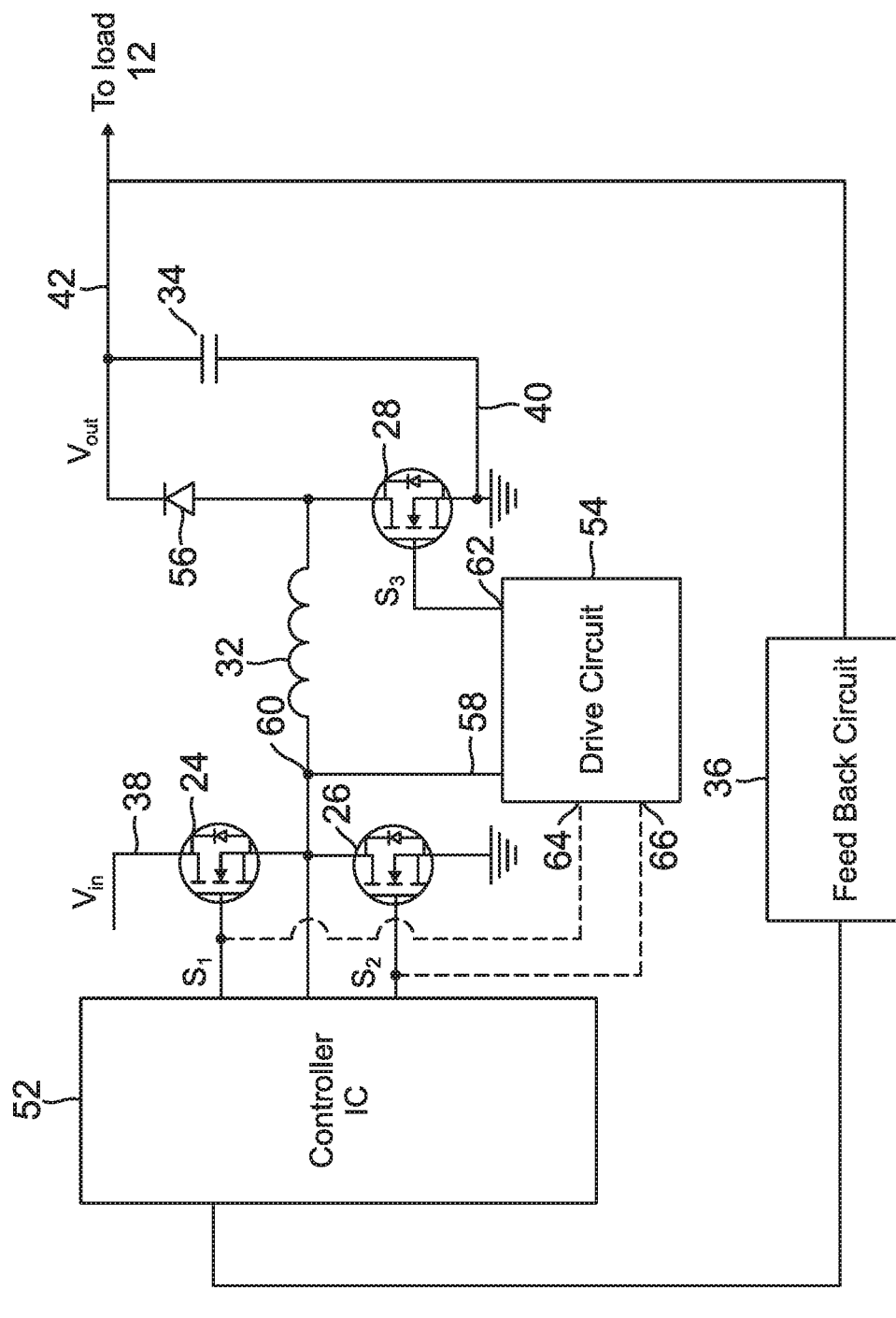
FIG. 3 is a diagram of a buck-boost converter power supply, according to an embodiment.

FIG. 3 is a diagram of a buck-boost converter power supply 50, according to an embodiment, where components common to the power supply 10 (FIG. 1) and the power supply 50 are identified with like reference numbers. The power supply 50 is similar to the power supply 10 of FIG. 1, except that instead of including the four switch-circuit-control-output-node controller IC 14 and the transistor 30, the power supply 50 includes a two switch-circuit-control-output-node controller IC 52, a drive circuit 54 configured to drive the transistor 28, and a diode 56. Consequently, the power supply 50 can include a less-expensive, and more plentiful, controller IC than the power supply 10 while still retaining the ability to operate in a boost mode, even if the controller IC 52 is a buck-mode controller.

The drive circuit 54 includes an input node 58 coupled to a phase node 60, and includes an output node 62 coupled to the control node, here a gate, of the transistor 28; that is, the drive circuit is configured to generate the signal S3 for the transistor 28. Alternatively, instead of, or in addition to, the input node 58, the driver circuit 54 can include one or both of other input nodes 64 and 66, which are respectively coupled to receive the signals S1 and S2 from the controller IC 52.

During operation of the buck-boost converter power supply 50, the power-supply controller IC 52 first determines whether $V_{in} > V_{out}$.

If the controller IC 52 determines that $V_{in} > V_{out}$, then the controller IC causes the power supply 50 to operate in a buck mode.

While operating in a buck mode, the drive circuit 54 generates the switching control signal S3 having a low level such that the transistor 28 is always off.

And the controller IC 52 switches the transistors 24 and 26 (via the signals S1 and S2, respectively) at a duty cycle that regulates $V_{out}$ to the value set by $V_{ref}$ (not shown in FIG. 3 but generated internally by the controller IC 52) and the feedback circuit 36.

If, however, the controller IC 52 determines that $V_{in} < V_{out}$, then the controller IC causes the power supply 50 to operate in a boost mode.

Figure 4:
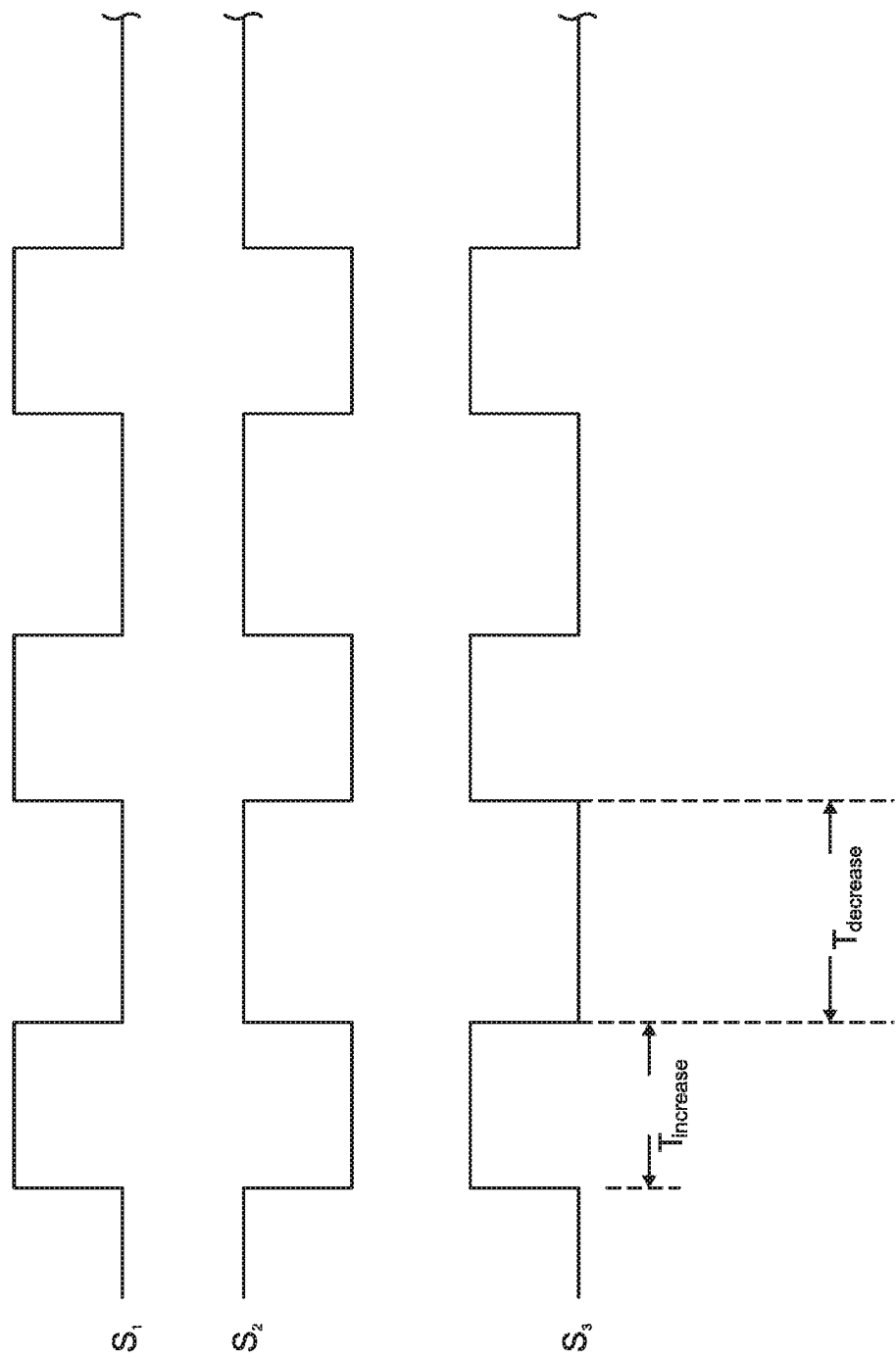
FIG. 4 is a timing diagram of the switch-circuit control signals of FIG. 3, according to an embodiment.

FIG. 4 is a diagram of the switch-control signals S1-S3 while the buck-boost converter power supply 50 of FIG. 3 is operating in a boost mode.

Referring to FIGS. 3-4, operation of the buck-boost converter power supply 50 in boost mode is described.

During a first portion, $T_{charge}$, of a boost-mode cycle, the controller IC 52 and the drive circuit 54 respectively generate the signals S1 and S3 having a logic-high level such that the transistors 24 and 28 are on, and the controller IC generates the signal S2 having a logic-low level such that the transistor 26 is off. Although FIG. 4 shows S1, S2, and S3 having the same logic-high and logic-low levels, the actual voltage levels of S1, S2, and S3 may differ because the source of the transistor 24 is coupled to the phase node 60, which is at a higher voltage (e.g., approximately $V_{in}$) than are the grounded sources of the transistors 26 and 28.

Therefore, during $T_{charge}$, a linearly increasing, i.e., inductor-charging, current $I_L$ flows from $V_{in}$, through the transistor 24, the inductor 32, and the transistor 28, to ground.

During a second portion $T_{discharge}$ of a boost-mode cycle, the controller IC 52 and the drive circuit 54 respectively generate the signals S1 and S3 having a logic-low level such that the transistors 24 and 28 are off, and the controller IC generates the signal S2 having a logic-high level such that the transistor 26 is on.

Therefore, during $T_{discharge}$, a linearly decreasing, i.e., inductor-discharging, current $I_L$ flows from ground, through the transistor 26, the inductor 32, and the diode 56, to $V_{out}$.

Consequently, the controller IC 52 is configured to regulate $V_{out}$ during a boost mode by controlling the duty cycle $$\left(\text{i.e., } \frac{T_{charge}}{T_{charge} + T_{discharge}}\right)$$

of the transistors 24 and 28.

Referring again to FIG. 3, if $V_{in} \sim V_{out}$ but is within a threshold voltage of $V_{out}$, then the controller IC 52 can control the power supply 50 to alternate between buck mode and boost mode to regulate $V_{out}$. The designer of the power supply 50 can select the threshold voltage based on criteria such as, but not limited to, the regulated value of $V_{out}$, and the anticipated steady-state load current to the load powered by the power supply 50.

Referring again to FIGS. 3 and 4, alternate embodiments of the buck-boost converter power supply 50 are contemplated. For example, the alternate embodiments described above in conjunction with FIGS. 1 and 2 for the power supply 10 may be applicable to the power supply 50. Furthermore, the power supply 50 can include the transistor 30 instead of the diode 56, and the driver circuit 54 can be configured to generate the signal S4 for driving the transistor 30, or the power supply can include another drive circuit that is configured to generate the drive signal S4.

Figure 5:
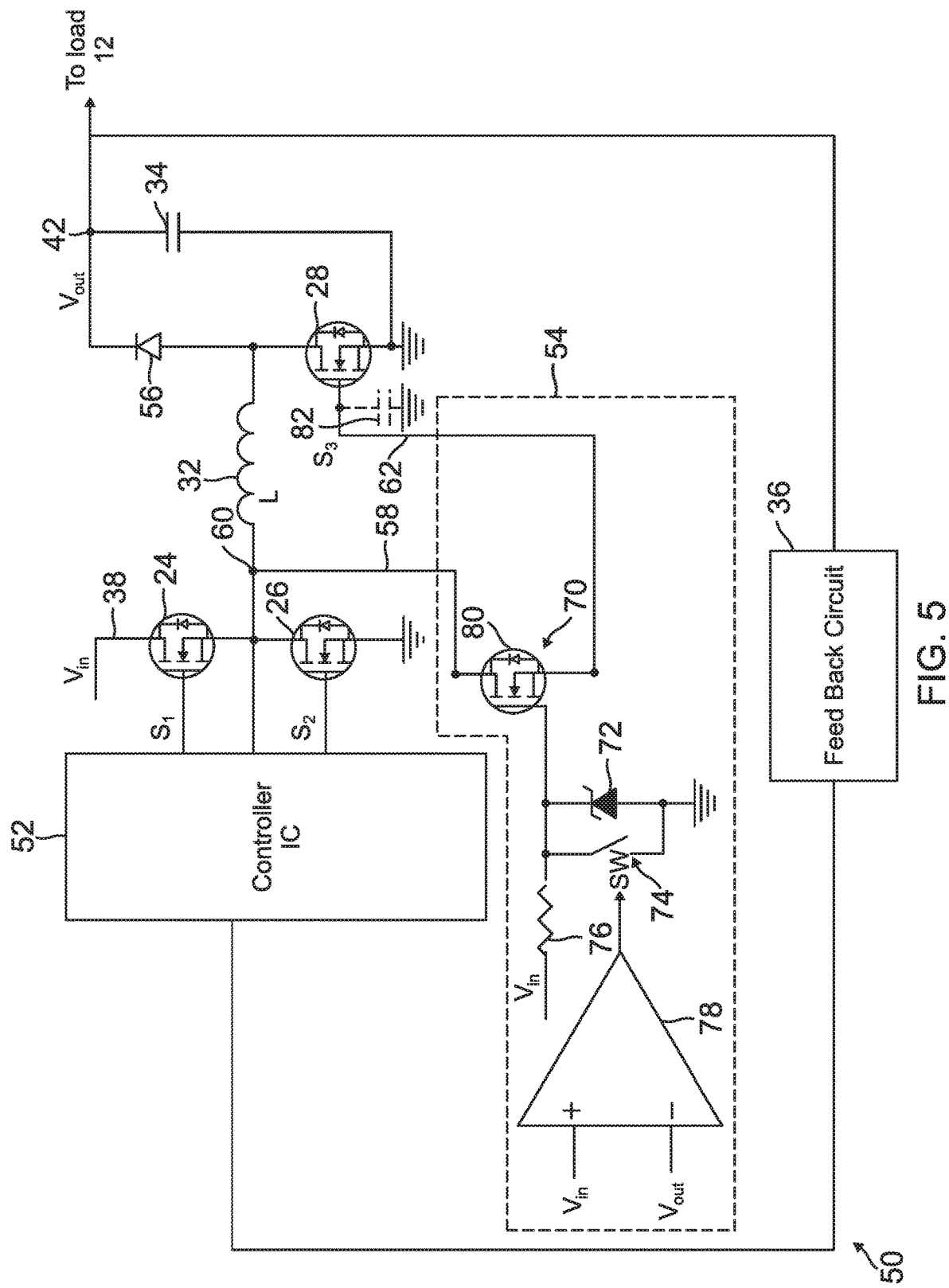
FIG. 5 is a diagram of a buck-boost converter power supply, according to another embodiment.

FIG. 5 is a diagram of the buck-boost converter power supply 50, including a detailed diagram of the drive circuit 54, according to an embodiment in which the driver circuit includes a single input node 58 coupled to the phase node 60. Furthermore, components common to FIGS. 3 and 5 are identified with like reference numbers.

In addition to the input node 58 and the output node 62, the drive circuit 54 includes a switch circuit, here an NMOS transistor, 70, a voltage-limit circuit, here a Zener diode, 72, a switch 74, an impedance circuit, here a resistor, 76, and a comparator circuit 78.

The NMOS transistor 70 has a drain coupled to the drive-circuit input node 58, a source coupled to the drive-circuit output node 62, and a control node, here a gate, coupled to the first supply node 38 ($V_{in}$) via the resistor 76. The NMOS transistor 70 also has a substrate node coupled to its source such that the NMOS transistor includes a body diode 80 having an anode coupled to the source and a cathode coupled to the drain.

The Zener diode 72 includes a cathode coupled to the gate of the transistor 70, and an anode coupled to the second supply input node 40 (ground in the described embodiment).

The switch circuit 74, which may be an NMOS or PMOS transistor, is coupled across the Zener diode 72.

And the comparator circuit 78 includes a non-inverting input node coupled to the first supply input node 38 so as to receive $V_{in}$, an inverting input node coupled to the supply output node 42 so as to receive $V_{out}$, and an output node coupled to a control node of the switch circuit 74.

During a buck mode of operation, the power supply 50 operates as described above in conjunction with FIGS. 3 and 4.

Furthermore, the drive circuit 54 operates as follows. Because, during buck mode, $V_{in} > V_{out}$, the comparator circuit 78 generates an output signal that closes the switch circuit 76, thereby pulling the gate of the NMOS transistor 70 to ground and turning off the NMOS transistor. Because the NMOS transistor 70 is off, any charge on a parasitic capacitance 82 between the gate of the transistor 28 and ground discharges through the body diode 80, to the phase node 60 when the phase node is at a low voltage (i.e., when the transistor 24 is off). And this charge flows from the phase node 60 to ground via the transistor 26 while the transistor 26 is on, or from the phase node 60 through the inductor 32, diode 56, to the supply output node 42 while the transistor 26 is off. Because there is no charge path to the gate of the transistor 28, the drive circuit 54 holds the gate of the transistor 28 at a low voltage level, and thus maintains the transistor 28 in an off state, during the buck mode.

During a boost mode of operation, the power supply 50 operates as described above in conjunction with FIGS. 3 and 4.

Furthermore, the drive circuit 54 operates as follows. Because, during boost mode, $V_{in}<V_{out}$, the comparator circuit 78 generates an output signal that opens the switch circuit 76, thereby allowing the resistor 76 to pull the gate of the NMOS transistor 70 up to the voltage ($V_{zener}$) across the Zener diode 72 to turn on the NMOS transistor 70—the Zener diode 72 limits the gate voltage of the NMOS transistor 28 to $V_{zener}-V_{th70}$ ($V_{th70}$ is the threshold voltage of the NMOS transistor 70) so that a high value of $V_{in}$ (which also appears on the phase node 60) will not damage the gate oxide of the NMOS transistor 28. Because the NMOS transistor 70 is on, the voltage at the gate of the transistor 28 equals, or approximately equals, the voltage at the phase node 60 such that the signal S3 follows the signal S1 per the timing diagram of FIG. 4, and such that the state of the transistor 28 follows the state of the transistor 24. When the transistor 24 is on, the voltage at the phase node 60, and thus the voltage at the gate of the transistor 28, equals, or approximately equals, $V_{in}$ such that the transistor 28 is also on. And when the transistor 24 is off, the voltage at the phase node 60, and thus the voltage at the gate of the transistor 28, equals, or approximately equals zero (or a diode drop below zero if the transistor 26 is off such that its body diode conducts in a diode-emulation mode) such that the transistor 28 is also off; the parasitic capacitance 82 discharges via the on transistor 26 (or through the inductor 32 if the transistor 26 is off). The above cycle repeats such that in boost mode, the state of the transistor 28 is the same as the state of the transistor 24.

Still referring to FIG. 5, alternate embodiments of the power supply 50 are contemplated. For example, the alternate embodiments described above in conjunction with FIGS. 3 and 4 may be applicable to the embodiment of the power supply 50 described in conjunction with FIG. 5. Furthermore, the power supply 50 can use the comparator circuit 78 to determine whether $V_{in}>V_{out}$, and thus whether the power supply should operate in buck mode or boost mode, instead of using a comparator on board the controller IC 52. Furthermore, the comparator circuit 78 can be configured to include and to implement a hystresis to avoid chattering.

Figure 6:
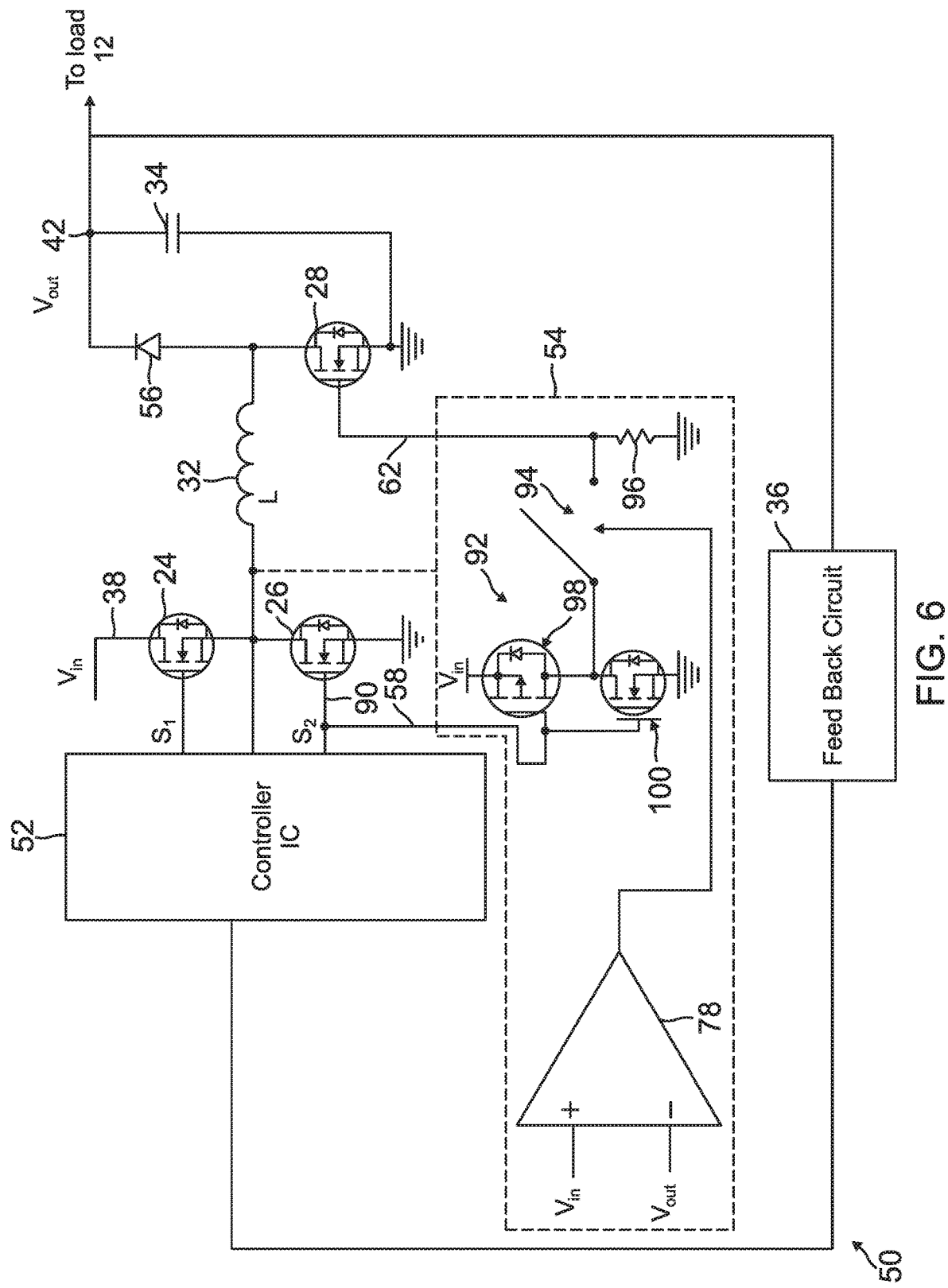
FIG. 6 is a diagram of a buck-boost converter power supply, according to yet another embodiment.

FIG. 6 is a diagram of the buck-boost converter power supply 50, including a detailed diagram of the drive circuit 54, according to another embodiment in which the driver circuit includes a single input node 58 coupled to the control node, here the gate, 90 of the transistor 26. Furthermore, components common to FIGS. 3, 5, and 6 are identified with like reference numbers.

In addition to the input node 58, the output node 62, and the comparator circuit 78, the drive circuit 54 includes an inverter 92, a switch circuit 94, and an impedance circuit, here a resistor, 96.

The inverter 92 includes a PMOS transistor 98 and an NMOS transistor 100. The PMOS transistor 98 includes a source coupled to the first supply input node 38 ($V_{in}$), a drain, a control node coupled to the input node 58, and a substrate node coupled to the source. And the NMOS transistor 100 includes a source coupled to the second supply input node 40 (ground in the described embodiment), a drain coupled to the drain of the PMOS transistor 98, a control node coupled to the input node 58, and a substrate node coupled to the source.

The switch circuit 94, which may be an NMOS or PMOS transistor, is coupled between the drain of the transistor 98 and the output node 62 of the drive circuit 54.

The resistor 96 is coupled between the output node 62 and the second supply input node 40 (ground in the described embodiment).

And the comparator circuit 78 includes a non-inverting input node coupled to the first supply input node 38 so as to receive $V_{in}$, an inverting input node coupled to the supply output node 42 so as to receive $V_{out}$, and an output node coupled to a control node of the switch circuit 94.

During a buck mode of operation, the power supply 50 operates as described above in conjunction with FIGS. 3 and 4.

Furthermore, the drive circuit 54 operates as follows. Because, during buck mode, $V_{in}>V_{out}$, the comparator circuit 78 generates an output signal that opens the switch circuit 96, thereby disconnecting the gate of the transistor 28 from the inverter 92 and allowing the resistor 96 to turn off the transistor 28, and to maintain the transistor 28 in the off state, by pulling the gate of the transistor 28 to ground.

During a boost mode of operation, the power supply 50 operates as described above in conjunction with FIGS. 3 and 4.

Furthermore, the drive circuit 54 operates as follows. Because, during boost mode, $V_{in}<V_{out}$, the comparator circuit 78 generates an output signal that closes the switch circuit 76, which thereby couples the output of the inverter 92 to the gate of the transistor 28 such that the inverter generates S3=$\overline{S2}$. Because S3=$\overline{S2}$, the signal S3 follows, or approximately follows, the signal S1 per the timing diagram of FIG. 4 such that the state of the transistor 28 follows the state of the transistor 24. The above cycle repeats such that in boost mode, the state of the transistor 28 follows the state of the transistor 24.

Still referring to FIG. 6, alternate embodiments of the power supply 50 are contemplated. For example, the alternate embodiments described above in conjunction with FIGS. 3-5 may be applicable to the embodiment of the power supply 50 described in conjunction with FIG. 6. Furthermore, it is contemplated that the source of switching transistor 98 can be connected to a supply voltage lower than $V_{in}$, which supply voltage may be generated by the controller IC 52 or by another voltage generator.

Figure 7:
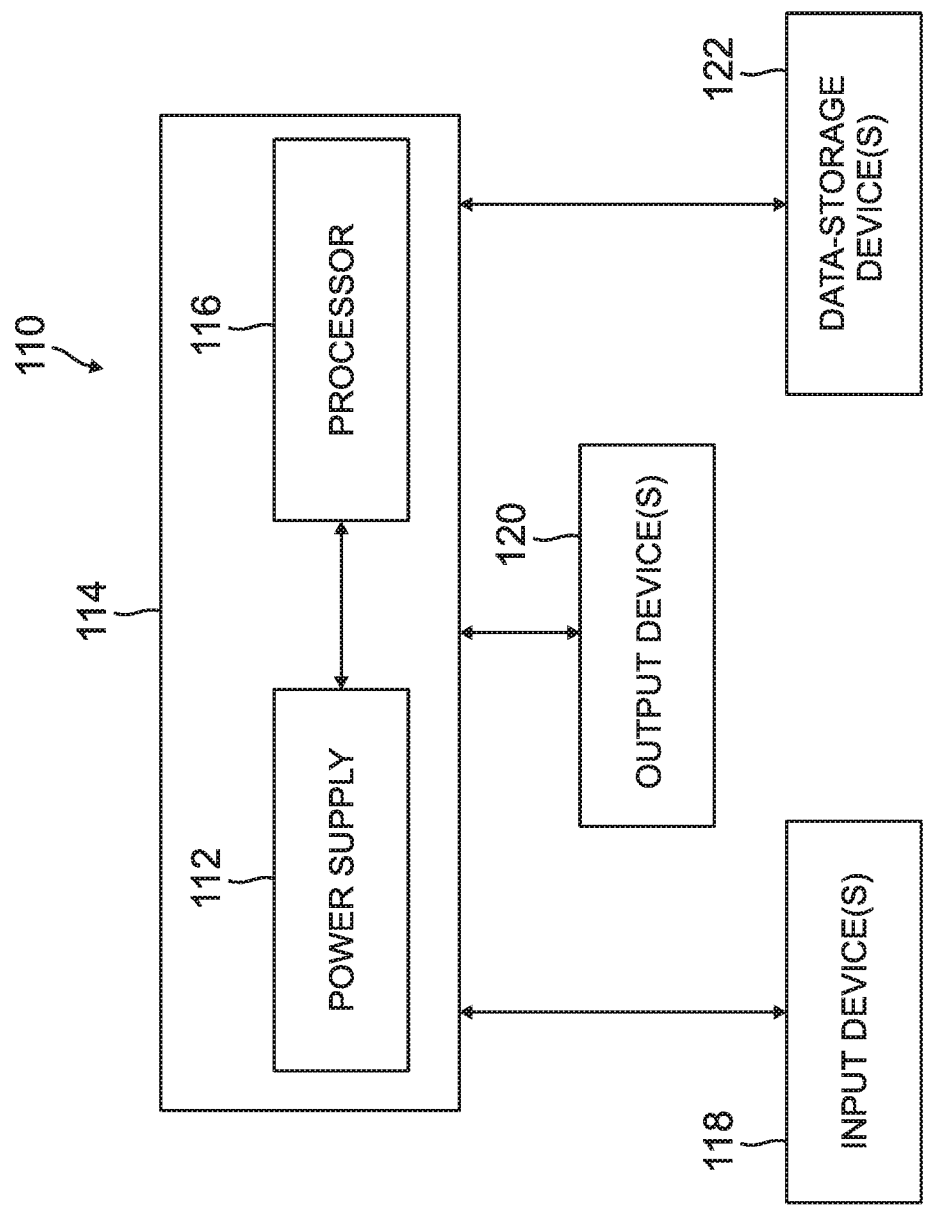
FIG. 7 is a diagram of a system that incorporates at least one of the power supplies of FIGS. 3, 5, and 6, according to an embodiment.

FIG. 7 is a block diagram of an embodiment of a computer system 110, which incorporates, as a power supply 112, one or more of the buck-boost converter power supplies 50 of FIGS. 3, 5, and 6, according to an embodiment. Although the system 110 is described as a computer system, it may be any system for which an embodiment of the power supply 112 is suited. Examples of such a system include, but are not limited to, a battery charger (e.g., USB compatible) that plugs into an automobile receptacle to charge a battery such as a battery in a smartphone, an auto charger, portable battery-powered equipment, a television (e.g., to provide the BUS power), a camera having a 24V AC power-supply input and a 12V DC power-supply input, and low-power systems (e.g., ≤36 Watts (W)).

The system 102 includes computing circuitry 114, which, in addition to the power supply 112, includes a processor circuit 116 (e.g., a microprocessor or microcontroller) powered by the supply (i.e., the processor circuit is a load of the supply), at least one input device 118, at least one output device 120, and at least one data-storage device 122.

In addition to being configured to process data, the processor circuit 116 can be configured to program, or otherwise to control, the power supply 112. For example, the processing circuit 116 can be configured to perform one or more of the functions of the power-supply controller IC (not shown in FIG. 7) of the power supply 112.

The input device (e.g., keyboard, mouse) 118 is configured to allow the providing of data, programming, and commands to the computing circuitry 114.

The output device (e.g., display, printer, speaker) 120 is configured to allow the computing circuitry 114 to provide data in a form perceivable by a human operator.

And the data-storage device (e.g., flash drive, hard disk drive, RAM, optical drive) 122 allows for the storage of, e.g., programs and data.

Still referring to FIG. 7, although described as powering the processor circuit 116, the power supply 112 can be configured to provide power to one or more other components of the system 110 instead of, or in addition to, the processor circuit. Furthermore, one or more components (e.g., the power-supply controller) of the power supply 112 can be disposed on a same integrated-circuit die as other components (e.g., the processor circuit 116) of the system 110; or the components of the power supply 112 and the other components of the system 110 can be disposed on different integrated-circuit dies.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, these one or more ICs may be coupled to one or more other ICs. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. A power supply, comprising:
   first and second supply input nodes respectively configured to receive first and second input voltages;
   a supply output node configured to provide an output voltage;
   a first switch circuit having a first conduction node coupled to the first supply input node, a second conduction node, and a control node configured to receive a first control signal;
   a filter circuit having a first node coupled to the second conduction node and having a second node;
   a second switch circuit having a first conduction node coupled to the second node of the filter circuit, having a second conduction node coupled to the second supply input node, and having a control node;
   a drive circuit having an input node coupled to one of the control node of the first switch circuit and the first node of the filter circuit, and having an output node coupled to the control node of the second switch circuit; and
   a third switch circuit having a first conduction node coupled to the first node of the filter circuit, a second conduction node coupled to the second supply input, and control node configured to receive a second control; and
   wherein the drive circuit includes
      the input coupled to the first node of the filter circuit,
      an NMOS transistor having a drain node coupled to the input node, having a source node coupled to the output node, having a control node, and having a substrate node coupled to the source node,
      a Zener diode having a cathode coupled to the control node of the NMOS transistor and having an anode coupled to the second supply input node,
      a fourth switch circuit coupled across the Zener diode and having a control node,
      an impedance circuit having a first node coupled to the first supply input node and having an output node coupled to the control node of the NMOS transistor, and
      a comparator circuit having a first input node coupled to the first supply input node, a second input node coupled to the supply output node, and an output node coupled to the control node of the fourth switch circuit, the comparator circuit configured to cause the first switch circuit to couple the control node of the NMOS transistor to the second supply input node in response to the first input voltage being greater than the output voltage.

2. The power supply of claim 1, wherein the drive circuit has the input node coupled to one of the control node of the first switch circuit, the first node of the filter circuit, and the control node of the third switch circuit.

3. The power supply of claim 1, further comprising a diode having an anode coupled to the second node of the filter circuit and having a cathode coupled to the supply output node.

4. The power supply of claim 1, further comprising a capacitor coupled between the supply output node and the second supply input node.

5. The power supply of claim 1, further comprising a controller having a first controller output node coupled to the control node of the first switch circuit and configured to generate the first control signal on the first controller output node.

6. The power supply of claim 1, further comprising:
   a controller having a first controller output node coupled to the control node of the first switch circuit, having a feedback node, and configured to generate the first control signal on the first controller output node; and
   a feedback circuit having an input node coupled to the supply output node and having an output node coupled to the feedback node of the controller.

7. The power supply of claim 1 wherein the drive circuit is configured to cause the second switching circuit to be open while the first switching circuit is open and to be closed while the first switching circuit is closed during a boost mode, and to cause the second switching circuit to be open during a buck mode.

8. The power supply of claim 1, further comprising:
a third switch circuit having a first conduction node coupled to the first node of the filter circuit, a second conduction node coupled to the second supply input node, and a control node configured to receive a second control signal; and
wherein the drive circuit includes
the input node coupled to the first node of the filter circuit,
an NMOS transistor having a drain node coupled to the input node, having a source node coupled to the output node, and having a control node,
a voltage limiter circuit having a first node coupled to the control node of the NMOS transistor and having a second node coupled to the second supply input node,
a fourth switch circuit coupled across the voltage limiter and having a control node,
an impedance circuit having a first node coupled to the first supply input node and having an output node coupled to the control node of the NMOS transistor, and
a comparator circuit having a first input node coupled to the first supply input node, a second input node coupled to the supply output node, and an output node coupled to the control node of the fourth switch circuit.

9. The power supply of claim 8, further comprising a controller having a first controller output node coupled to the control node of the first switch circuit, having a second controller output node coupled to the control node of the third switch, and configured to generate the first and second control signals on the first and second controller output nodes, respectively.

10. The power supply of claim 1, further comprising a controller having a first controller output node coupled to the control node of the first switch circuit, having a second controller output node coupled to the control node of the third switch circuit, and configured to generate the first and second control signals on the first and second controller output nodes, respectively.

11. The power supply of claim 1, further comprising:
a third switch circuit having a first conduction node coupled to the first node of the filter circuit, a second conduction node coupled to the second supply input node, and a control node configured to receive a second control signal; and
wherein the drive circuit includes
the input node coupled to the control node of the first switch circuit,
an inverter having an input node coupled to the input node of the drive circuit, and having an output node coupled to the output node of the drive circuit,
a fourth switch circuit coupled between the output node of the drive circuit and the control node of the second switch circuit,
an impedance circuit having a first node coupled to the control node of the second switch circuit and a second node coupled to the second supply input node, and
a comparator circuit having a first input node coupled to the first supply input node, a second input node coupled to the supply output node, and an output node coupled to the control node of the fourth switch circuit, the comparator circuit configured to cause the fourth switch circuit to couple the output node of the drive circuit to the control node of the second switch circuit in response to the first input voltage being less than the output voltage.

* * * * *